May 24, 1955     H. W. HOLTSHOUSER     2,709,198
LOCKING COVER ASSEMBLY FOR ELECTRICAL RECEPTACLES
Filed Aug. 7, 1950
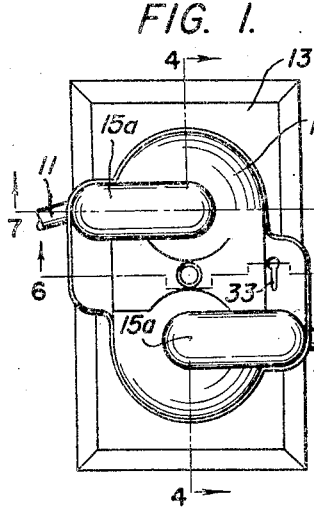
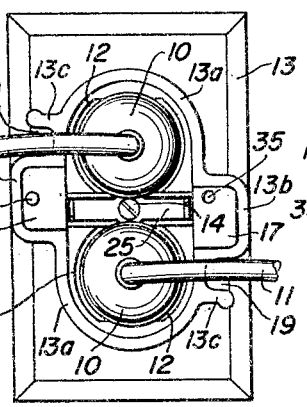
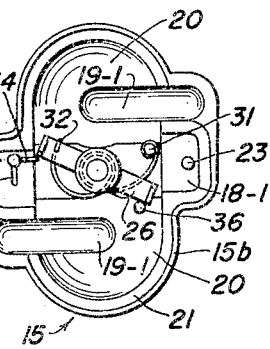
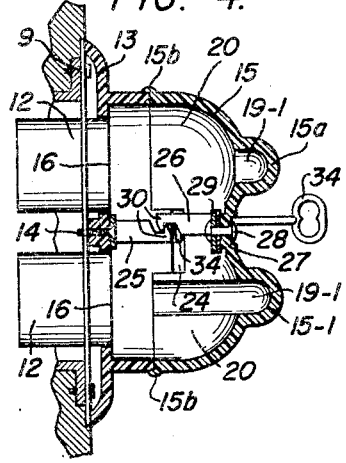
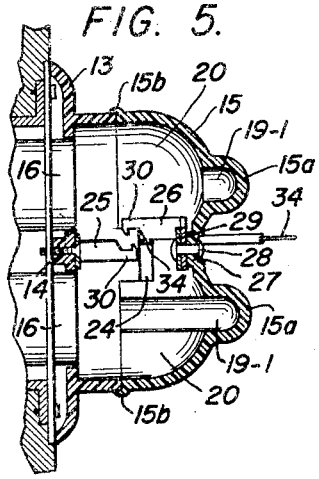
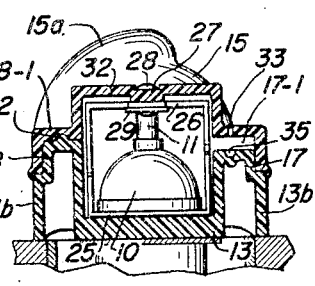
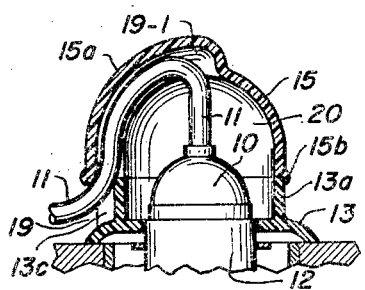
Inventor:
HERBERT W. HOLTSHOUSER,

2,709,198

LOCKING COVER ASSEMBLY FOR ELECTRICAL RECEPTACLES

Herbert W. Holtshouser, Salt Lake City, Utah

Application August 7, 1950, Serial No. 178,102

8 Claims. (Cl. 174—67)

This invention relates to safety covers for standard types of electrical receptacles as commonly employed in electrical wiring systems to provide plug-in utility outlets at various locations throughout such systems.

It is common practice to leave utility plug-in outlets of electrical wiring systems exposed, so that plug-in connections may be quickly and conveniently made from time to time. However, since such outlets are customarily located in the interior walls of houses, near floor level, they constitute a potential danger to babies and young children, who are often tempted to probe into the outlet openings or between the blades of inserted plugs with fingers, hairpins, or other electrically conductive objects.

Various types of protective shields or covers for these electrical plug-in outlets have been developed heretofore, but none have gone into extensive use. They have generally been inconvenient to handle, and have not afforded the positive protection necessary under the circumstances.

It is a primary object of the present invention to provide a locking cover for use with standard, household electrical receptacles as protective shields for the plug-in outlets thereof, the locking arrangement being mechanically simple and compact, and the entire cover being easily installed in place of the usual face plate.

Another object is to provide the above by a structural arrangement largely capable of being molded from a plastic material, and, thus, capable of low cost manufacture.

An outstanding feature of the invention is the provision of a simple yet effective key-actuated latching mechanism in connection with a face plate having a separable cover, the cover being formed to accommodate electrical plugs inserted within the plug-in outlets of an electrical receptacle.

The latch mechanism embodies a stationary keeper, which is installed coincidentally with installation of the face plate part of the device, and a movable latch which is attached directly to the underside of the cover part of the device.

Additional objects and features of the invention will become apparent from the following detailed description of the presently preferred specific embodiment illustrated in the accompanying drawing for the purpose of exemplifying the generic inventive concepts involved.

In the drawing:

Fig. 1 represents a front elevation of the device installed over a standard electrical receptacle having dual plug-in outlets into which the plugs of electrical utility cords are inserted, the device being shown with its cover portion locked in place;

Fig. 2, a similar view, but showing the cover part of the device unlocked and removed from the face plate part thereof;

Fig. 3, an inside elevation of the cover plate part of the device in the unlocked position of the latch;

Fig. 4, a longitudinal, central section taken on the line 4—4 of Fig. 1, with the key in position ready to unlock the latching mechanism, the plugs being eliminated from this view;

Fig. 5, a view corresponding to that of Fig. 4, but illustrating the key turned and the latching mechanism thereby placed in its unlocked condition;

Fig. 6, a transverse, central section taken on the line 6—6 of Fig. 1; and

Fig. 7, a transverse section taken on the line 7—7 of Fig. 1.

Referring to the drawing: as illustrated in Figs. 1 and 2, the locking cover assembly of the invention is adapted to replace the ordinary face plate of a standard, household electrical receptacle 9, and to accommodate plugs, such as those indicated 10, of ordinary electrical utility cords 11 which are plugged into the plug-in outlets 12 of such receptacle. In the illustrated instance, a dual outlet receptacle is involved.

The device of the invention is designed to accommodate practically any type of plug without being unduly bulky. It comprises a face plate part 13 adapted to be secured over the receptacle 9 by means of a customary attaching screw 14, Fig. 2, and a cover part 15 configurated to accommodate and protectively cover the plugs 10 and portions of the assciated cords 11 contiguous thereto, preferably in a streamlined manner.

Both the face plate part 13 and the cover part 15 are advantageously molded to final form from a suitable plastic material by techniques well known in the art of fabricating plastic articles. Accordingly, the device of the invention is capable of large scale, low cost, mass production.

For receiving the cover part in snugly fitting relationship, and for accommodating electrical plugs as well as latching mechanism, the face plate 13 has an upstanding wall molded integrally therewith and projecting outwardly from its outer face largely intermediate peripheral margins thereof. Such upstanding wall has oppositely disposed, substantially semi-circular portions 13a partially surrounding respective apertures 16, Figs. 4 and 5, which apertures are adapted to register with and expose to use the respective plug-in outlets 12. Interconnecting corresponding and opposing termini of such portions 13a are respective outwardly off-set portions 13b, which outwardly bound a key-receiving boss 17 at one side of the device and a somewhat more raised guide boss 18 at the opposite side of the device, see Fig. 6. Projecting from the wall portions 13a at locations spaced apart from respectively opposite ends of the off-set wall portions 13b are laterally protuberant wall portions 13c, which, together with such opposite ends of the wall portions 13b, define respective cord-accommodating pocket recesses 19 closed at their rear by the respective wall portions 13a for safety purposes, as hereinafter explained.

The cover part 15 is configurated to fit over and meet with the upstanding wall portions 13a, 13b, and 13c of the face plate part 13. To this end it defines an outwardly offset recess 17–1 and a counterpart thereof 18–1, for cooperative placement relative to the key-receiving boss 17 and the guide boss 18, respectively, of the face plate part. It also defines respective tunnel recesses 19–1 for cooperative placement relative to the cord-receiving pocket recesses 19 of the face plate part, and an elongate central chamber 20 for cooperation with the plug and latch accommodating central area bounded by the upstanding wall of such face plate part.

The tunnel recesses 19–1 are open to the central chamber 20 to accommodate the cords 11 as they emerge from the plugs 10. Their outwardly disposed ends open, from above, into the respective pocket recesses 19, so that, when the cover is in place on the face plate, the cords 11 emerge from the device through openings which communicate with the outlet-accommodating interior of the device only along devious paths. This effectively prevents the introduction of electrically conductive objects into the interior of the device by children, and is a valuable safety feature of the invention. The remainder of such cover part 15, except for the tunnel-defining portions 15a, is preferably dome-shaped in order to substantially streamline the device relative to the plugs and contiguous portions of the utility cords which is encloses.

For the purpose of fitting snugly over the upstanding wall of the face plate part 13 as a protective cover for the plug-in outlets 12 of the electrical receptacle, the cover part 15 has its lower peripheral surface 21, Fig. 3, which mates with and seats upon the upper peripheral surface of such upstanding wall of the face plate part 13, shouldered as at 15b. It should be noted in this connection that the upstanding bosses 17 and 18 of the face plate part serve as guides within their receiving recesses 17-1 and 18-1 of the cover part to facilitate mating placement of the cover part over the face plate part.

In order to insure proper orientation of the cover part relative to the face plate part, suitable mating formations are provided, for example, a protuberance 22 projecting from the top of boss 18, Figs. 2 and 6, and a receiving recess 23, Fig. 3, in the undersurface of the cover part at recess 18-1.

In its mating position relative to the face plate part, the cover part 15 easily accommodates the plugs 10 and contiguous portions of the utility cords 11. Such cords 11 fit into the tunnel recesses 19-1, as shown in Fig. 7, and pass downwardly over those portions of the respective walls 13a which close the rear ends of respective pocket recesses 19, thereupon turning to emerge laterally from the device at opposite sides thereof.

It is a feature of the invention that the cover part is arranged to be latched to the face plate part, so as to be removable therefrom only by the use of a key. To this end, in the illustrated embodiment, the face plate part 13 is provided with a fixed keeper member 25, and the cover part 15 is provided with a resiliently actuated, key operated, latch member 26, the two being disposed centrally of the device between the two outlet apertures 16.

As preferred and as here illustrated, the keeper member 25 is formed as a substantially U-shaped element separate from the face plate part 13, and is tightly secured in suitable operative position by means of the screw 14 which fastens the face plate part to the electrical receptacle proper. The latch member 26 is identically formed but reversely positioned, being rotatably attached to the underside of the cover part 15 in registering position relative to the keeper member 25. Advantageously, such latch member 26 is mounted on a bushing 27, Figs. 4 and 6, depending from and molded as an integral portion of the cover part 15, a rivet 28 and interposed washer 29 serving as fastening means.

The free terminals of the U-shaped keeper 25 and latch member 26 are configured for locking interengagement. To this end, the respective terminals are preferably formed as hooks 30, corresponding and opposingly positioned terminals having such hooks 30 of reverse formation so as to interengage when brought together.

As stated hereinbefore, the keeper member 25 is secured in fixed position by means of the screw 14. The latch member 26, however, is rotatable on the mounting bushing 27, and is normally urged into what might be termed its latching position against an abutment post 31, Figs. 3 and 6, by means of a spring 32. The abutment post 31 preferably depends integrally from the undersurface of the cover part 15, and serves as an anchorage for the spring 32.

Thus, since the latch member 26 is constantly in its interengaging position, and is resiliently yieldable, the cover part 15 need merely be snapped into position over the face plate part 13 in order to effect locking of the cover in its protective relationship with the face plate.

It should be noted that a key chamber 24, Figs. 4 and 5, is defined in recess 17-1 when the cover part is in latched position relative to the face plate part. A keyhole 33 leads into the key chamber 24 through cover part 15, so that a key 34 may be inserted thereinto and turned to forcibly displace the latch member 26 from its locking position with the keeper member 25, as shown in Fig. 3. A recess 35, Figs. 2 and 6, in the top of boss 17 receives the usual pilot portion of the key to hold the key steady during the unlocking operation, and an abutment post 36, Fig. 3, prevents the latch member from being moved too far.

As so unlocked, the cover part 15 may be freely removed from the face plate part 13. Removal of the key 34 following the removal of the cover part from the face plate part, enables spring 32 to push the latch member 26 back into its normal, interlocking position against abutment post 31.

While the invention is particularly advantageous in its application to dual-outlet receptacles, as can be seen from the embodiment illustrated, the principles thereof may be easily adapted to single outlet receptacles or to receptacles having three or more outlets.

Whereas this invention is here illustrated and described with respect to a particular preferred embodiment thereof, it should be understood that various changes, apart from the mere substitution of equivalents, may be made therein and various other embodiments may be adopted on the basis of the teachings hereof, by those skilled in the art, without departing from the protective scope of those of the following claims which are generic to the broader inventive concepts disclosed.

I claim:

1. A locking cover assembly for electrical receptacles, comprising a face plate part arranged to fit over an electrical receptacle, exposing the outlets thereof to plug-in, utility connection; a safety cover part arranged to fit over the face plate part and define a closed chamber enshrouding the otherwise exposed outlets; locking mechanism attached to said face and cover plate parts, so as to be disposed within the said closed chamber, said locking mechanism including a fixed keeper member and a movable latch member; and a keyhole formed in said cover part in operative proximity to said movable latch member for accommodating a key to displace said latch member relative to said keeper member.

2. The combination recited in claim 1, wherein the face plate part has an upstanding wall peripherally enclosing said outlets, the safety cover part is configured to fit over and seat upon said wall, the said keeper member and latch member are bounded by said wall, and a key chamber is formed adjacent and in open communication with said latch member with the boundary of said wall.

3. The combination recited in claim 2, wherein cord-accommodating tunnels are defined by the undersurface of the cover part above respective outlets of the said receptacle; and wherein pocket recesses are defined by said face plate part and said upstanding wall of the face plate part, said pocket recesses opening outwardly of the assembly, between the safety cover part and the face plate part, and having their inner ends closed by said wall, said tunnels forming upward continuations of the respective pocket recesses.

4. The combination recited in claim 3, wherein the said upstanding wall follows in general the configuration of electric utility plugs as inserted within the plug-in outlets of dual outlet electrical receptacles, but is offset outwardly intermediate the two outlets to provide oppositely disposed bosses, one of said bosses being higher than the other as a guide for the safety cover part, and wherein the safety cover part is configured to substantially follow the contour of said utility plugs and to provide outwardly offset recesses in registry with and for receiving said bosses, said key chamber being formed between the top of the lower boss and the underside of said cover part, the said keeper member and latch member being disposed intermediate the two outlets.

5. The combination recited in claim 1, wherein the said keeper member is associated with the face plate part and is adapted to be secured in fixed relationship therewith by the same fastening means utilized to secure the face plate part over the electrical receptacle; and wherein the said latch member is associated with the safety cover part.

6. The combination recited in claim 1, wherein the said keeper member is a substantially U-shaped element associated in upstanding relationship with the face plate part, and the said latch member is a similar U-shaped element associated in depending relationship with the safety cover part; and wherein said U-shaped elements have their corresponding free terminals configured for locking interengagement.

7. The combination recited in claim 1, wherein the said face plate part and safety cover part are provided with sets of mating boss and recess formations, the boss of one of said sets being of less depth than its recess to define a key chamber, said chamber being adjacent and in open communication with said latch member; and wherein said keyhole leads into said key chamber.

8. A locking cover assembly for electrical receptacles, comprising a face plate part arranged to fit over an electrical receptacle and having at least one aperture therein adapted to receive a plug-in outlet of said receptacle substantially flush with the upper face of said face plate; an upstanding peripheral wall integral with said face plate part and rising from said upper face thereof to protectively surround said aperture; said wall including offset portions defining at least one pocket recess open at its top and laterally of said wall facing outwardly of the area surrounded thereby, said wall providing a closed end for said pocket; a safety cover part configured to fit over and mate with the said peripheral wall of the face plate part and enshroud the otherwise exposed plug-in outlet aperture, said cover part and said face plate part defining an electric-plug-accommodating chamber, said cover part having an offset portion arranged to overhang said pocket recess and provided with a passage having a downwardly directed opening adapted to register with the open top of said pocket recess, to therewith define a channel leading into said chamber for accommodating the cord of an electric plug, that portion of the peripheral, face plate wall which provides the closed end for said pocket recess serving as a safety barrier against the insertion of foreign objects into said chamber when the locking cover assembly is installed with respect to an electrical receptacle into which an electrical cord is plugged; and means for locking said cover part to said face plate part.

UNITED STATES PATENTS
References Cited in the file of this patent

| | | |
|---|---|---|
| 834,591 | Streams | Oct. 30, 1906 |
| 1,968,506 | Schneider | July 31, 1934 |
| 2,157,957 | Heise et al. | May 9, 1939 |
| 2,433,358 | Garberding | Dec. 30, 1947 |
| 2,462,756 | Leopold | Feb. 22, 1949 |